United States Patent
Nelluri et al.

(10) Patent No.: US 10,996,948 B2
(45) Date of Patent: May 4, 2021

(54) SOFTWARE CODE MINING SYSTEM FOR ASSIMILATING LEGACY SYSTEM FUNCTIONALITIES

(71) Applicant: BANK OF AMERICA CORPORATION, Charlotte, NC (US)

(72) Inventors: Govinda Rajulu Nelluri, Telangana (IN); Aparna Pattyreddy, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 28 days.

(21) Appl. No.: 16/186,776

(22) Filed: Nov. 12, 2018

(65) Prior Publication Data
US 2020/0150954 A1 May 14, 2020

(51) Int. Cl.
| G06F 9/44 | (2018.01) |
| G06F 8/76 | (2018.01) |
| G06F 8/60 | (2018.01) |
| G06F 8/40 | (2018.01) |
| G06F 8/75 | (2018.01) |
| G06F 8/61 | (2018.01) |

(52) U.S. Cl.
CPC ............ *G06F 8/76* (2013.01); *G06F 8/40* (2013.01); *G06F 8/60* (2013.01); *G06F 8/75* (2013.01); *G06F 8/61* (2013.01)

(58) Field of Classification Search
CPC ..... G06F 8/40; G06F 8/60; G06F 8/61; G06F 8/75; G06F 8/76
See application file for complete search history.

(56) References Cited

U.S. PATENT DOCUMENTS

| 5,627,979 | A | 5/1997 | Chang et al. |
| 5,958,008 | A | 9/1999 | Pogrebisky et al. |
| 6,279,008 | B1 | 8/2001 | Tung Ng et al. |
| 6,510,468 | B1* | 1/2003 | Hayne ............ H04L 29/06 709/246 |
| 6,675,230 | B1 | 1/2004 | Lewallen |
| 6,801,224 | B1 | 10/2004 | Lewallen |
| 6,854,123 | B1 | 2/2005 | Lewallen |
| 6,941,520 | B1 | 9/2005 | Lewallen |
| 6,957,439 | B1 | 10/2005 | Lewallen |
| 7,020,882 | B1 | 3/2006 | Lewallen |
| 7,194,743 | B2 | 3/2007 | Hayton et al. |
| 7,392,483 | B2 | 6/2008 | Wong et al. |
| 7,895,522 | B2 | 2/2011 | Wong et al. |

(Continued)

*Primary Examiner* — Lewis A Bullock, Jr.
*Assistant Examiner* — Tina Huynh
(74) *Attorney, Agent, or Firm* — Michael A. Springs; Moore & Van Allen PLLC; R. W. McCord Rayburn

(57) ABSTRACT

A system, computer program product, and computer-implemented method for mining software code and assimilating legacy system functionalities are provided. Embodiments comprise a system configured for installing a mining tool on a first system having a first format, the mining tool being configured to continually capture code stored on the first system; identifying a function on the first system, wherein the function is configurable to be independently executable; pulling the function from the first system; converting the function from the first format to a second format; and deploying the function in the second format onto a second system, wherein the function is stored on the second system in the second format and configured to be called by a program.

20 Claims, 4 Drawing Sheets

(56) References Cited

U.S. PATENT DOCUMENTS

| | | | |
|---|---|---|---|
| 7,962,344 B2 | 6/2011 | Sharpe et al. | |
| 8,402,376 B2 | 3/2013 | Argue et al. | |
| 8,417,715 B1* | 4/2013 | Bruckhaus | G06Q 10/04 707/758 |
| 8,516,508 B1 | 8/2013 | Tran | |
| 8,843,945 B2 | 9/2014 | Tran | |
| 9,372,607 B1 | 6/2016 | Penilla et al. | |
| 9,778,924 B2 | 10/2017 | Batabyal et al. | |
| 9,798,522 B2 | 10/2017 | Strachota et al. | |
| 9,904,527 B1* | 2/2018 | Miller | G06F 8/443 |
| 2003/0063120 A1 | 4/2003 | Wong et al. | |
| 2004/0153992 A1 | 8/2004 | Molina-Moreno et al. | |
| 2006/0020620 A1* | 1/2006 | Iyer | G06F 16/2465 |
| 2006/0069717 A1* | 3/2006 | Mamou | G06Q 10/00 709/203 |
| 2007/0061626 A1* | 3/2007 | Nelson | G06F 11/3688 714/38.14 |
| 2008/0043020 A1 | 2/2008 | Snow et al. | |
| 2008/0060009 A1* | 3/2008 | Kelts | G06F 3/0481 725/39 |
| 2010/0306254 A1* | 12/2010 | Williamson | G06F 9/543 707/770 |
| 2011/0050728 A1* | 3/2011 | Williamson | G06Q 10/10 345/649 |
| 2012/0197626 A1* | 8/2012 | Kejariwal | G06F 11/3419 703/22 |

\* cited by examiner

SOFTWARE CODE MINING SYSTEM FOR ASSIMILATING LEGACY SYSTEM FUNCTIONALITIES

BACKGROUND

Presently, there are various kinds of modularized functionalities already developed in legacy monolithic applications of large enterprises that can be utilized individually as working software by existing users. However, due to incompatibility with modern program architectures, these legacy functionalities are not directly accessible and require recoding before they can be properly integrated into modern systems which can be a resource intensive and time-consuming process. As a result, there exists a need for a new technology for assimilating functionalities from legacy systems into modern programming architectures.

BRIEF SUMMARY

The following presents a simplified summary of one or more embodiments of the invention to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the following address these and/or other needs by providing an innovative system, method and computer program product for mining software code and assimilating legacy system functionalities. In a particular embodiment, a system comprises at least one memory device with computer-readable program code stored thereon; at least one communication device connected to a network; and at least one processing device, wherein the at least one processing device is configured to execute the computer-readable program code to: install a mining tool on a first system having a first format, the mining tool being configured to continually analyze and capture code stored on the first system; identify a function on the first system, wherein the function is configurable to be independently executable; pull the function from the first system; convert the function from the first format to a second format; and deploy the function in the second format onto a second system, wherein the function is stored on the second system in the second format and configured to be called by a program.

In some embodiments, the second format is an application programming interface format specifying one or more routines configured to be called and executed within a program.

In some embodiments, the at least one processing device is further configured to identify a previously converted function stored in the second system in response to a user request for a requested function, wherein an operation of the requested function and the previously converted function are the same.

In some embodiments, the at least one processing device is further configured to pull the function from the first system in response to a user request for generating the function from the code on the first system.

In some embodiments, the mining tool is configured to generate a map of one or more identified modular functions in the first system, wherein the map defines a location of the one or more identified modular functions in the first system.

In some embodiments, the function in the first format is not erased from the first system as a result of converting and deploying the function in the second format onto the server.

In some embodiments, the second system is a server or web server, or an API container configured for storing and providing a converted function.

In some embodiments, the first format and the second format are different formats, and wherein the first format and the second format are incompatible formats.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
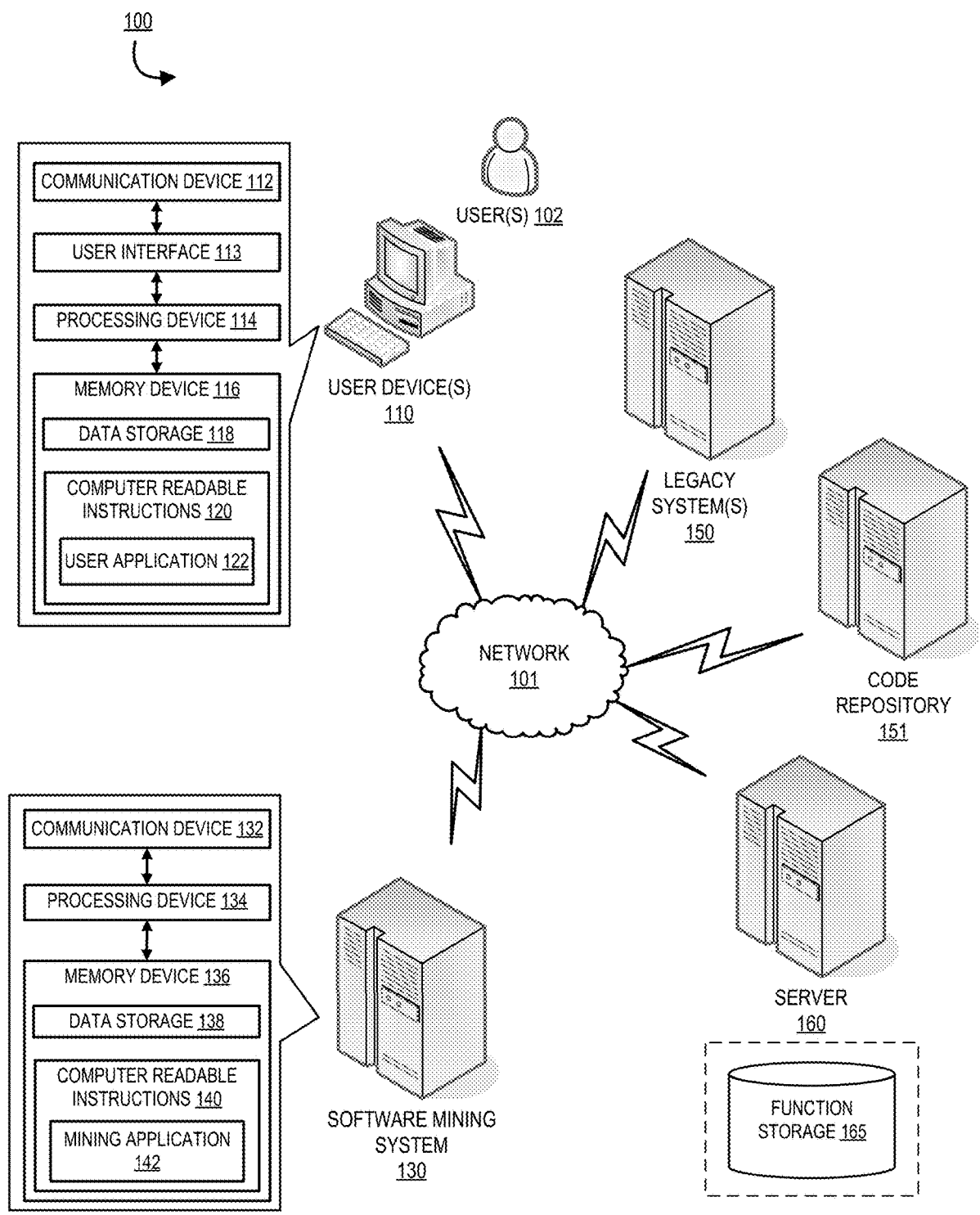
Figure 2:
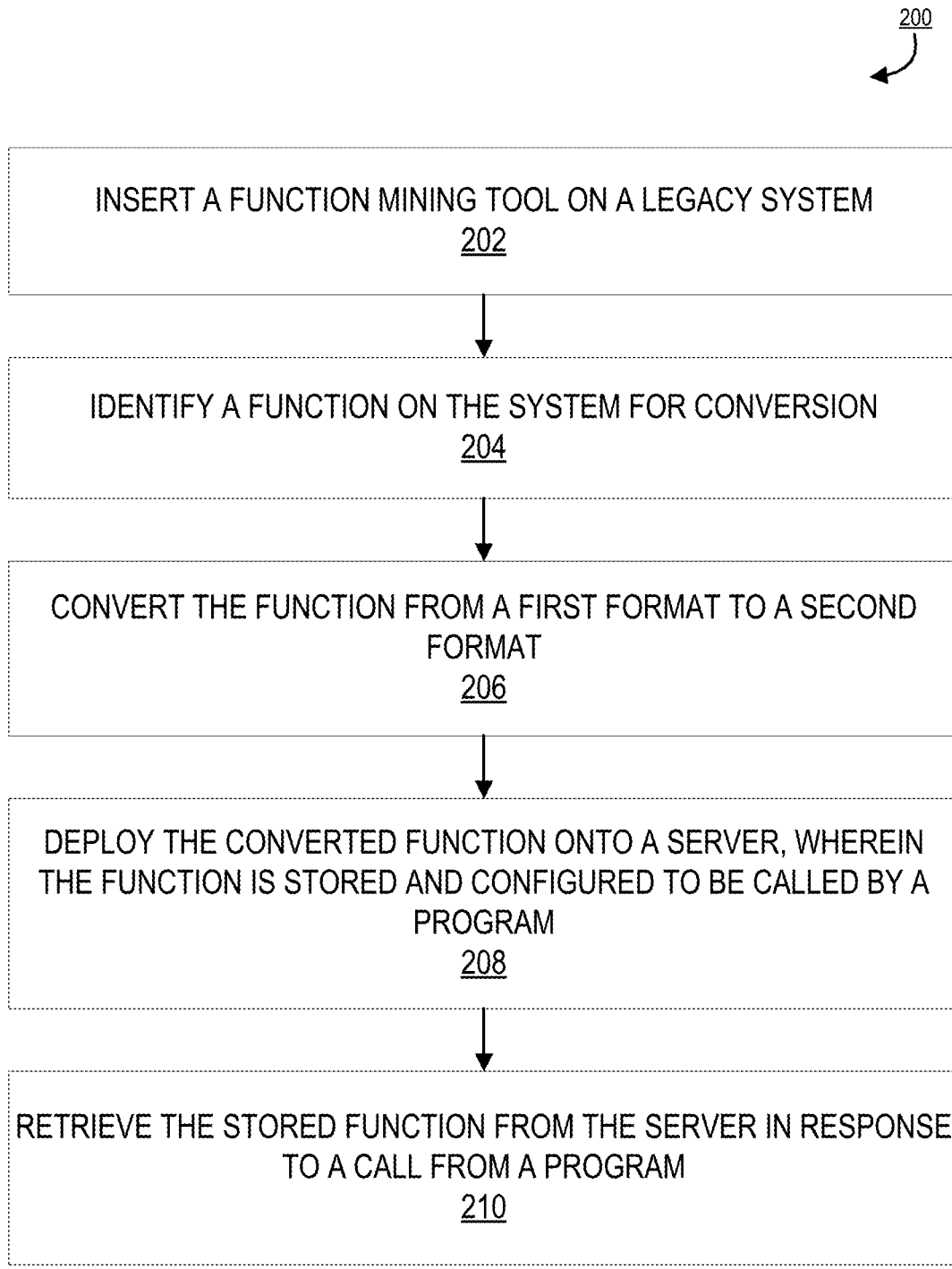
Figure 3:
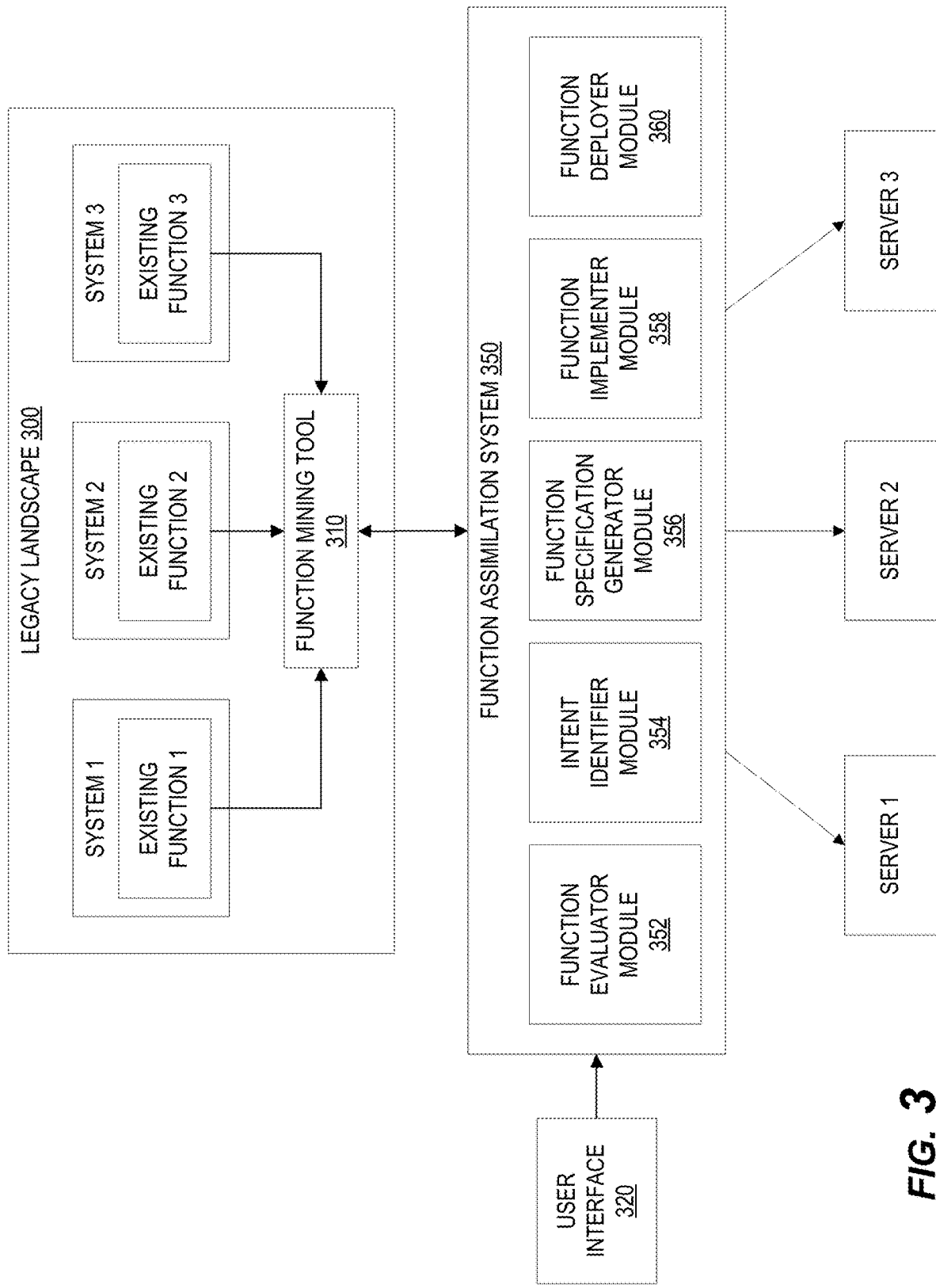
Figure 4:
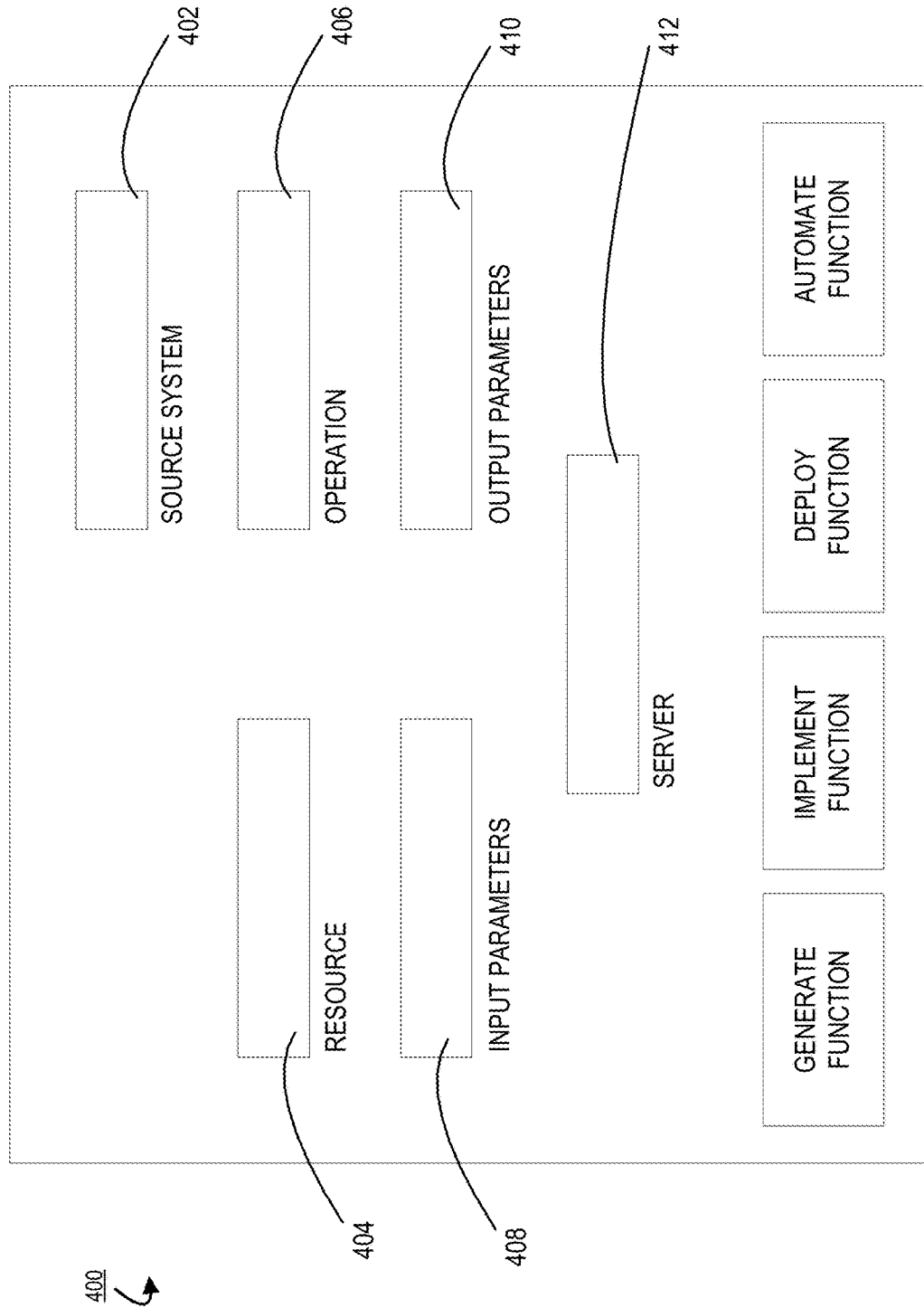

Having thus described embodiments of the invention in general terms, reference will now be made to the accompanying drawings, wherein:

FIG. 1 provides a function mining and assimilation system environment, in accordance with one embodiment of the invention;

FIG. 2 provides a process map for function mining and assimilation, in accordance with one embodiment of the invention;

FIG. 3 provides a block diagram of a function mining tool and assimilation system, in accordance with one embodiment of the invention; and FIG. 4 provides an exemplary graphical user interface, in accordance with one embodiment of the invention.

DETAILED DESCRIPTION OF EMBODIMENTS OF THE INVENTION

Embodiments of the invention are directed to mining tool and assimilation system for mining or extracting functionalities from legacy systems and converting the mined functions to a new format that is compatible with modern architectures. A mining tool or crawler is inserted into the legacy systems (e.g., mainframe systems) and is configured to identify functions that are independently executable on the legacy systems. The identified, modular functions are pulled or copied from the legacy systems without being deleted and transformed into a new format (e.g., application programming interface (API)) and deployed into a server. The converted functions in the server are configured to be called on by users via a user interface and executed within other programs.

Embodiments of the invention provide a technical solution to the problem of how to extract and convert various modularized functionalities already developed on legacy systems to modern architectures where the converted functionalities can be consumed individually as working software by users. Furthermore, due to the automated nature of the mining tool, functions within legacy systems can be identified and quickly converted without the demanding time requirements and resource usage of manual code rewriting. The present invention does not rewrite the code of the function, but instead identifies and extracts modular components which can be transformed into reusable, functional modules for other programs. The mining tool and assimilation system are programming language agnostic and compatible across legacy and modern system architectures.

In a specific embodiment, the system converts legacy functionalities (e.g., a mainframe job, a C++ function, an SQL procedure) into an API.

In some embodiments, the invention further comprises an intent identifying component or module configured to automatically identify a desired function request to be implemented by the user based on matching a user input to an existing functionality in the legacy system. For example, the system may automatically identify and implement a fetch function based on specific user input. In this way, the user is not required to manually generate a new function and resource usage is reduced as creation of redundant functionalities is avoided. In further embodiments, the system implements machine learning to automatically identify and pull existing functionalities from the legacy system and/or server without requiring the user to manually request and generate a new function.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, a "function" or "functionality" may refer to any routine, subroutine, software component, or sequence of one or more program instructions configured for performing a specific task upon being executed by the processor of a computing device. In some embodiments of the invention, a function may be a modular function, wherein the function is an individually working component. In some embodiments, the function may be non-complex in type and executable on its own without any coded dependencies on additional functions. Examples of legacy functionalities include a mainframe job, a C++ function, an SQL procedure, and the like which are limited in their own application usages. In a specific example, legacy functionalities captured from legacy systems are code portions having various formats or programming languages. In other embodiments, the functionalities captured from the legacy systems are converted into application programming interfaces (APIs) by the systems described herein. Non-limiting examples of API specification languages and frameworks used herein include RESTful API Modeling Language (RAIVIL) and Swagger.

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "computing resource" or "computing hardware" may be used to refer to elements of one or more computing devices, networks, or the like available to be used in the execution of tasks or processes. A computing resource may include processor, memory, or network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a blockchain). A "resource" may also be used to refer to labor availability of a workforce (i.e., available hours).

A "user" as used herein may refer to any entity or individual associated with the mining tool and function assimilation system. In some embodiments, a user may be a computing device user, a mobile device application user, a system operator, database manager, a support technician, and/or employee or customer of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like). In a specific embodiment, a user is an individual generating an API within function assimilation system via a provided user interface from a set of legacy functions on legacy systems.

In accordance with embodiments of the invention, the term "entity" or "enterprise" may be used to include any organization or collection of users that may interact with the function mining and assimilation system. An entity may refer to a business, company, or other organization that either maintains or operates the system or requests use and accesses the system. The terms "institution" and "entity" may be used to include any organization that processes transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. Furthermore, it should be understood that the entities discussed above are merely exemplary and that the present invention may extend to any domain or enterprise having legacy systems.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module (such as the robotic process automation module and/or the entity platform described herein) may monitor a user input into the system. In further embodiments, the system may store said user input during an interaction in order to substantially replicate said user input at another time.

As used herein, a "connection" or an "interaction" may refer to any communication between one or more users, one or more entities or institutions, and/or one or more devices or systems within the system environment described herein. For example, an interaction may refer to a transfer of data between systems or devices, an accessing of stored data by one or more devices, a transmission of a requested task, or the like.

FIG. 1 provides a block diagram illustrating function mining and assimilation system environment 100, in accordance with an embodiment of the invention. The environment 100 includes a user device 110 associated and/or used with authorization of a user 102, a software mining system 130, a legacy entity system 150, and a server 160. It should be understood, that within the environment 100 there may be more than one of any of the components or systems described or that one or more of components or systems may be embodied as a single device or multiple devices operating in unison.

As used herein, a "processing device," such as the processing devices 114 and 134, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. For example, by being configured to execute the steps described herein, the processor becomes a specialized device directed to mining and converting functions from legacy systems.

As used herein, a "user interface," such as the user interface 113, generally includes a plurality of interface devices and/or software that allow a user to input commands and/or data to direct the processing device to execute instructions or tasks. For example, the user interfaces presented in FIG. 1 may include a graphical user interface (GUI) or an interface to input computer-executable instructions that direct the processing device to carry out specific functions. The user interface employs certain input and output devices to input data received from a user or output data to a user. When a user interacts with the input and output devices, the device or system generates a signal specific to that input device to process the user interaction. These input and output devices may include a display, mouse, keyboard, button, touchpad, touch screen, microphone, speaker, LED, light, joystick, switch, buzzer, bell, and/or other user input/output device for communicating with one or more customers. Typically a user interacts with a user interface of a device which is managed and bridged to data accessed by a data layer via a presentation layer. The presentation layer communicates with the data layer to translate messages, commands, and the like between the user and the data layer of an application. In some embodiments, the system presents the user with information stored on legacy systems (e.g., available functionalities) via the user interface without requiring that the user directly drill-down through the legacy systems themselves. In this way, the user interface may efficiently display information from the legacy systems on the user device via the user interface. An example of a user interface is shown is FIG. 4 in accordance with one embodiment of the invention.

As used herein, a "memory device" such as memory devices 118 and 138, generally refers to a device or combination of devices that store one or more forms of computer-readable media for storing data and/or computer-executable program code/instructions. Computer-readable media is defined in greater detail below. For example, in one embodiment, the memory device includes any computer memory that provides an actual or virtual space to temporarily or permanently store data and/or commands provided to the processing device when it carries out its functions described herein. In one embodiment, a memory device includes function storage 165 of the server 160 which is configured to store one or more converted functions from the legacy systems.

As used herein, a "communication device" generally includes a modem, server, transceiver, and/or other device for communicating with other devices on a network, and/or a user interface for communicating with one or more customers. Referring again to FIG. 1, the communication devices 112 and 132 comprise communication interfaces having one or more devices configured to communicate with one or more other devices on a network, such as a mobile device, a personal computing device, a server, a distributed computing cluster, third party systems, and/or the like. The processing device is configured to use the network communication device to transmit and/or receive data and/or commands to and/or from the other devices connected to the network. Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

The systems and devices communicate with one another over the network 101 and perform one or more of the various steps and/or methods according to embodiments of the disclosure discussed herein. The network 101 may include a local area network (LAN), a wide area network (WAN), and/or a global area network (GAN). The network 102 may provide for wireline, wireless, or a combination of wireline and wireless communication between devices in the network. In one embodiment, the network 101 includes the Internet.

The user device 110 includes a communication device 112 communicably coupled with a processing device 114, which is also communicably coupled with a memory device 116. The processing device 114 is configured to control the communication device 112 such that the user device 110 communicates across the network 101 with one or more other systems. The processing device 114 is also configured to access the memory device 116 in order to read the computer readable instructions 120, which in some embodiments includes a user application 122. The user application 122 allows for communication of the user device 110 with the other systems and devices within the environment 100 such as the software mining system 130, the legacy system 150, and/or the server 160. The user application 122 generally provides a user interface 113 configured to allow the user 102 to receive information transmitted as well as input information requested by the other systems and communicate with and request the execution of tasks from the software mining system 130 or server 160. In some embodiments, the user application 122 further allows the user to interact with and/or manipulate the user application 122 via the user device 110 and the user interface 113 of the user device. The memory device 116 also includes a data repository 118 or storage database for storing pieces of data or files that can be accessed by the processing device 114.

The software mining system 130 includes a communication device 132 communicably coupled with a processing device 134, which is also communicably coupled with a memory device 136. The processing device 134 is configured to control the communication device 122 such that the software mining system 130 communicates across the network 101 with one or more other systems. The processing device 134 is also configured to access the memory device 136 in order to read the computer readable instructions 140, which in some embodiments includes a software mining application 142. In some embodiments, the software mining application 142 allows for communication with the other systems and devices within the environment 100 such as the user device 110, the legacy system 150 and/or server 160 and for the customization and installation of a software mining tool or "bot" on another device in the system such as the legacy system 150. The memory device 136 also includes a data repository 138 or storage database for storing pieces of data or files that can be accessed by the processing device 134. In some embodiments, the software mining system 130 may be part of the user device 110 and/or legacy system 150.

The legacy system 150 and the server 160 generally comprise components similar to those of the user device 110 and the software mining system 130 (i.e., processor, memory, communication device, etc.). In one embodiment, the legacy system 150 is a financial system maintained and operated by a financial entity such as bank. The legacy system 150 may include one or more specialized functions specifically tied to the legacy systems and unable to be reused in a modern programming landscape without additional processing, such as the processing described herein. In another embodiment, the legacy system 150 may be a code inventory, repository 1501 or the like configured for storing legacy code portions or programs such as developmental code not stored in a production setting. In another embodiment, the legacy system 150 may contain production and/or development level code. In one embodiment, the server 160 further includes a function storage database 165 for storing functions extracted and converted from the legacy systems 160 by the software mining tool. In yet another embodiment, the server 160 may include an API container system configured for storing the functions identified and/or pulled from the legacy system by the mining tool.

The user application 122 and the mining application 142 are for instructing the processing devices on their respective systems to perform various steps of the methods discussed herein, and/or other steps and/or similar steps. In various embodiments, one or more of the various applications discussed are included in the computer readable instructions stored in a memory device of one or more systems or devices other than their respective systems and/or devices. For example, in some embodiments, the software mining application 142 is stored and configured for being accessed by a processing device of the user device 110 connected to the network 101. In various embodiments, the user application 122, the mining application 142 are stored and executed by different systems/devices. In some embodiments, the discussed applications may be similar and may be configured to communicate with one another. In some embodiments, the various applications may be considered to be working together as a singular application despite being stored and executed on different systems.

In various embodiments, one or more of the systems discussed above, such as the software mining system 130, may be embodied as more than one system and the various components of the system are not collocated, and in various embodiments, there are multiple components performing the functions indicated herein as a single device. For example, in one embodiment, multiple processing devices may perform the functions of the processing device 134 of the software mining system 130 described herein. Furthermore, one or more of the various device and/or systems described herein may be embodied as one or more combined devices and/or systems.

In various embodiments, the user device 110, the software mining system 130, the legacy system 150, the server 160, and/or other systems may perform all or part of a one or more method or process steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

As used herein, the term "controller" generally refers to a hardware device and/or software program that controls and manages the various systems described herein such as the user device 110, the software mining system 130, the legacy system 150, and/or the server 160, in order to interface and manage data flow between systems while executing commands. In some embodiments, the controller may be integrated into one or more of the systems described herein. In some embodiments, the controller may perform one or more of the processes, actions, or commands described herein.

FIG. 2 provides a process map for function mining and assimilation 200, in accordance with one embodiment of the invention. As illustrated in block 202, the system initially inserts a software (or function) mining tool on one or more legacy systems. The system enables the mining tool or crawler to crawl through applications of the legacy systems. In some embodiments, the mining tool is an application or software program installed on one or more of the systems described herein, such as the systems described in FIG. 1. In one specific embodiment, the mining tool is software installed on the legacy system and maintained by the mining system. In another embodiment, the mining tool software is installed on the mining system itself, wherein the mining tool remotely accesses the legacy system over a network. In other embodiments, the mining tool is a hardware device or module which is configured to be installed on the legacy systems.

The mining tool is configured to continually identify and capture code on the legacy system to be extracted as reusable, modular functions as described herein. The mining tool may be configured to identify the code of interest (e.g., modular functions) and then report the identified code to the system before continuing to identify additional code portions. In one embodiment, the mining tool is a crawler, bot, or the like configured to systematically crawl through and analyze code on the legacy systems. In some embodiments, the mining tool is installed on a legacy system and provided with an initial location on the legacy system to begin function identification. The mining tool may then be configured to systematically analyze the legacy system in its entirety (e.g., all applications stored thereon). In one embodiment, the mining tool randomly analyzes the entirety of the legacy system following analysis of the initial location. In another embodiment, the mining tool is configured to stop analysis and identification of functions on the legacy system after analyzing all the code on the legacy system. In another embodiment, the mining tool is configured to crawl through the legacy system again after a predetermined amount of time to identify any code that has been updated following a previous scan of the legacy system by the mining tool. In yet another embodiment, the mining tool is configured to move to another legacy system after completely crawling through all the code on a first legacy system. In this way, the crawler is configured to independently crawl through the entirety of available legacy systems. The mining tool may be configured analyze code and/or legacy systems by a nearest neighbor method, wherein after completing analysis of a code portion and/or legacy system, the mining tool is configured to move to the next nearest code portion and/or legacy system to continue analysis. In some embodiments, the mining tool is a software mining tool configured to identify existing software functions for function modernization. Function modernization may refer to function formatting conversion or function rewriting or porting from a legacy system to a modern computer programming language, wherein a function is adapted for being executed in a different computing environment.

Once inserted or installed on the legacy systems, the mining tool is configured to crawl through the legacy systems automatically identify functions on the legacy systems for conversion, as illustrated in block 204. As previously discussed, the mining tool is configured to continually browse and analyze code stored on the legacy systems to identify the functions. A function or functionality may include any routine, subroutine, software component, or sequence of one or more program instructions configured for performing a specific task upon being executed by the processor of a computing device. In some embodiments the code or applications stored on the legacy systems are monolithic, wherein portions of the code or applications cannot be separated without additional processing. The mining tool or crawler is configured to identify those portions and separate them from the monolithic code or applications. In some embodiments, the code or applications may contain executables or the like that render the code or applications incompatible or not directly compatible with other languages or systems. In some embodiments, the mining tool or other portion of the system described herein may convert the incompatible code or application to a compatible format. In one example, the system converts the code or application to an API format, wherein an interface is positioned on top of the program code or application to convert an output to a new format compatible with other programming languages or systems (e.g., Python or the like).

The mining tool includes a selection policy for defining which code or functions on the legacy systems to identify for conversion. Preferably, functions identified for conversion by the mining tool are defined by the selection policy as modular functions that work as individual components and are able to be converted to new function paradigms, wherein the function itself is executable and applicable to different application spaces. For example, an account balance fetch function may be applicable and executable within both a payment transfer space and a misappropriation prevention space.

The mining tool may identify functions for conversion by identifying functions that are independent of other functions or code such as functions that do not call to additional functions or do not have additional embedded functions. In some embodiments, function identification for conversion may be based on the complexity or number of executed processes or calculations required by a function. Complexity of a function may be further related to the input parameters of the function. For example, while an account number input parameter may be defined as non-complex, a file input parameter may be defined as complex, wherein the mining tool would not identify the function having a file as an input parameter. The selection policy may define a complexity threshold over which functions are not selected for conversion. In some embodiments, the mining tool may further include a revisit policy defining how often the mining tool scans through the legacy system to check for updates (e.g., new code). In some embodiments, the mining tool scans the legacy systems according to a predetermined or regular schedule defined by the revisit policy.

In some embodiments, the mining tool categorizes identified functions into categories based on function characteristics such as input parameters, output parameters, operation or task performed, complexity, programming language or format, or the like. In some embodiments, the mining tool generates a map of the modularized functions identified within the legacy system, wherein the identified functions are set apart from other functions present on the legacy system. In some embodiments, identified functions are stored in memory (volatile or non-volatile) by the mining tool. In this way, previously identified functions may be quickly provided to a user when called on within the system. The mining tool does not pull code or functions from the legacy systems upon a user request, but instead retrieves previously identified functions ready for conversion. In an alternative embodiment, the mining tool may also be configured to pull code in real-time following a user request.

As illustrated in block 206, the system converts the function from a first format to a second format. In some embodiments, code is captured from the legacy systems in a legacy programming format which is not directly usable by modern programming languages. The code may be converted into a format that is usable by modern programming languages. In some embodiments a function is able to be converted into a new function paradigm. Examples of legacy code include a mainframe job, a C++ function, an SQL procedure, and the like which are limited in their own application usages. In one embodiment code is captured form the legacy systems and converted into an application programming interface (API) which provides specifications for routines, data structures, object classes, variables, and the like. Non-limiting examples of API specification languages and frameworks used herein include RESTful API Modeling Language (RAML), Swagger and any other specification methodologies. In some embodiments, the system applies a wrapper to the identified code or functions to convert the code or functions to a new usable format. The wrapper acts as an interface that is configured to allow normally incompatible functions or programing to work together by converting incompatible data between the functions with little additional computation thereby improving computing device functioning by conserving computing resources.

The system receives a request from a user for a specific function. In response, the system pulls the requested code or function from the legacy systems. In one embodiment, the mining tool pulls the function from a generated function map or memory. The system does not erase or delete the function on the legacy system. As illustrated in block 208, once converted, the pulled function is deployed by the system into a new system such as a server, wherein the function is stored and configured to be called by a program (e.g., a program executed by a user of the system described herein).

In one embodiment, the system inserts a token into the code pulled from the legacy systems to provide an identifier for the contents of the code. The token may be used to confirm the authenticity of the code by checking for changes to the token. In one embodiment, the system generates a hash value and inserts the hash value into the code.

As illustrated in block 210, the system is further configured to retrieve a stored function from the server in response to a call from a program. In some embodiments, a stored function is called on by a user via a user interface such as the graphical user interface of FIG. 4, wherein the user generates a new software function (e.g., API) using the converted legacy code mined from the legacy systems. In one embodiment, the system pulls and provides a function to a user based on the code of the function and/or the demand of the user (e.g., requested operation and/or input parameters). For example, more than one function may be configured for fulfilling a demanded or requested operation of the user (e.g., a pull request for account details), however each of the functions may have different input parameters (e.g., account number or customer ID/name). In this example, the system may be configured to provide a function to the user based on both the requested operation and the input provided by the user, wherein the system provides a function having the same requested operation as well as requiring the same input parameters provided by the user. The system may provide different functions to the user in response to different user requests wherein the user requesting the same operation but provides different input parameters. In this way, the system intelligently pulls functions from the legacy systems and adapts to the user-provided input in the user interface. In one embodiment, the system generates and provides the user with a link representative of the converted function, wherein the generated link is insertable by the user to call the associated function from the server and into a new program or code being generated by the user. The insertable link may refer back to the converted function stored in the server.

FIG. 3 provides a block diagram of a function mining tool and assimilation system, in accordance with one embodiment of the invention. Legacy landscape 300 comprises one or more legacy systems (e.g., systems 1-3) which contain one or more existing coded functions (e.g., exiting functions 1-3). The mining tool 310 is inserted into the legacy landscape 300 by the function assimilation system 350. The function assimilation system 350 is in communication with the mining tool 310 to provide the mining tool 310 with instructions for capturing existing code from the systems of the legacy landscape 300. The mining tool 310 is configured to extract one or more of the existing coded functions from the legacy systems in response to a request transmitted from a user interface 320 by a user computing device. The user interface 320 allows for a user to interact with the various components of the function assimilation system 350 in order to generate new functions from the code extracted from the legacy systems.

The function assimilation system 350 comprises a function evaluator module 352, an intent identifier module 354, a function specification generator module 356, a function implementer module 358, and a function deployer module 360. The function assimilation system 350 receives the captured code from the legacy systems from the mining tool 310.

The function evaluator module 352 is configured to evaluate the detail provided by the user to the function assimilation system 350 from the user interface 320 such as the inputted fields of the user interface of FIG. 4. The intent identifier module 354 is configured to identify matching functionalities in the legacy systems to those requested by the user in the user interface. In some embodiments, the system leverages machine learning to automatically identify a user requested function based on the user input to the user interface. The function specification generator module 356 is configured to generate the function specification in the format needed for the converted function. In a specific example, the module 356 is configured to generate a specification for an API in an appropriate format (e.g., RAML or Swagger). The function implementer module 358 is configured to converting the code from the legacy system for use by the modern function. The function deployer module 360 is configured for deploying the code to a modern runtime environment for use such as one or more servers (servers 1-3).

FIG. 4 provides an exemplary graphical user interface 400, in accordance with one embodiment of the invention. The graphical user interface 400 presents a simple interface to a user that does not require detailed knowledge of coding associated with either legacy or modern programming languages. Furthermore, the user is not required to drill down through numerous lines of code. The interface 400 provides a source system input 402 for indicating a source legacy system from which to pull code for a generated function. A resource input 404 is provided for specifying a data set to pull information from for the requested operation. For example, the resource could be an account database or payment database. An operation input is provided for receiving a requested operation of a function. For example, the operation may be a fetch operation, a create operation (e.g., object create), a convert operation, an update operation, or the like. The interface 400 further provides for entry of input parameters 408 and output parameters 410 for the requested operation. In one example, an operation may include a fetch request of an account balance of a specific account from an account database, wherein the input parameters include an account number and the output parameters include an account balance. The interface 400 further provides a server input 412 for specifying a location for deployment of a generated function.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with software mining and legacy function assimilation.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for legacy functionality mining, conversion, and assimilation and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for mining software code and assimilating legacy system functionalities, the system comprising:
   at least one memory device with computer-readable program code stored thereon;
   at least one communication device connected to a network; and
   at least one processing device, wherein the at least one processing device is configured to execute the computer-readable program code to:
      install a mining tool on one or more source legacy systems, the mining tool being configured to continually analyze and capture code stored on the one or more source legacy systems;
      display, to a user, a graphical user interface comprising a source system input field for receiving indication of the one or more source legacy systems, a resource input field for receiving indication of one or more data sets of a requested function, an operation input field for receiving indication of one or more operations of the requested function, an input parameters field for receiving indication of one or more input parameters of the requested function, an output parameters field for receiving indication of one or more output parameters of the requested function, and a server input field for receiving indication of one or more locations for deployment of the requested function;

receive, via the graphical user interface, user input indicating:
- via the source system input field, a first system of the one or more source legacy systems, wherein the first system is a mainframe having a first format;
- via the resource input field, a first data set of the requested function;
- via the operation input field, one or more operations of the requested function;
- via the input parameters field, one or more input parameters of the requested function;
- via the output parameters field, one or more output parameters of the requested function; and
- via the server input field, a second system for deployment of the requested function;

identify, using the mining tool and based on the user input, a function on the first system corresponding to the requested function, wherein the function is configurable to be independently executable;

pull, using the mining tool, the function from the first system;

convert, based on the user input, the function from the first format to a second format, wherein the second format comprises an application programming interface positioned on top of the function; and deploy, based on the user input, the function in the second format onto the second system, wherein the second system is a server, and wherein the function is stored on the second system in the second format and configured to be called by a program.

2. The system of claim 1, wherein the second format specifies one or more routines configured to be called and executed within the program.

3. The system of claim 1, wherein the at least one processing device is further configured to identify a previously converted function stored in the second system in response to a user request for the requested function, wherein an operation of the requested function and the previously converted function are the same.

4. The system of claim 1, wherein the at least one processing device is further configured to pull the function from the first system in response to a user request for generating the function from the code on the first system.

5. The system of claim 1, wherein the mining tool is configured to generate a map of one or more identified modular functions in the first system, wherein the map defines a location of the one or more identified modular functions in the first system.

6. The system of claim 1, wherein the function in the first format is not erased from the first system as a result of converting and deploying the function in the second format onto the second system.

7. The system of claim 1, wherein the second system is a server, web server, or API container configured for storing and providing a converted function.

8. The system of claim 1, wherein the first format and the second format are different formats, and wherein the first format and the second format are incompatible formats.

9. A computer program product for mining software code and assimilating legacy system functionalities, wherein the computer program product comprises at least one non-transitory computer-readable medium comprising computer-readable instructions, the computer-readable instructions, when executed by at least one processing device, cause the at least one processing device to:

install a mining tool on one or more source legacy systems, the mining tool being configured to continually analyze and capture code stored on the one or more source legacy systems;

display, to a user, a graphical user interface comprising a source system input field for receiving indication of the one or more source legacy systems, a resource input field for receiving indication of one or more data sets of a requested function, an operation input field for receiving indication of one or more operations of the requested function, an input parameters field for receiving indication of one or more input parameters of the requested function, an output parameters field for receiving indication of one or more output parameters of the requested function, and a server input field for receiving indication of one or more locations for deployment of the requested function;

receive, via the graphical user interface, user input indicating:
- via the source system input field, a first system of the one or more source legacy systems, wherein the first system is a mainframe having a first format;
- via the resource input field, a first data set of the requested function;
- via the operation input field, one or more operations of the requested function;
- via the input parameters field, one or more input parameters of the requested function;
- via the output parameters field, one or more output parameters of the requested function; and
- via the server input field, a second system for deployment of the requested function;

identify, using the mining tool and based on the user input, a function on the first system corresponding to the requested function, wherein the function is configurable to be independently executable;

pull, using the mining tool, the function from the first system;

convert, based on the user input, the function from the first format to a second format, wherein the second format comprises an application programming interface positioned on top of the function; and deploy, based on the user input, the function in the second format onto the second system, wherein the second system is a server, and wherein the function is stored on the second system in the second format and configured to be called by a program.

10. The computer program product of claim 9, wherein the second format specifies one or more routines configured to be called and executed within the program.

11. The computer program product of claim 9, wherein the at least one processing device is further configured to identify a previously converted function stored in the second system in response to a user request for the requested function, wherein an operation of the requested function and the previously converted function are the same.

12. The computer program product of claim 9, wherein the at least one processing device is further configured to pull the function from the first system in response to a user request for generating the function from the code on the first system.

13. The computer program product of claim 9, wherein the mining tool is configured to generate a map of one or more identified modular functions in the first system, wherein the map defines a location of the one or more identified modular functions in the first system.

14. The computer program product of claim 9, wherein the function in the first format is not erased from the first system as a result of converting and deploying the function in the second format onto the second system.

15. The computer program product of claim 9, wherein the second system is a server, web server, or API container configured for storing and providing a converted function.

16. The computer program product of claim 9, wherein the first format and the second format are different formats, and wherein the first format and the second format are incompatible formats.

17. A computer-implemented method for mining software code and assimilating legacy system functionalities, the computer-implemented method comprising:
   installing a mining tool on one or more source legacy systems, the mining tool being configured to continually analyze and capture code stored on the one or more source legacy systems;
   displaying, to a user, a graphical user interface comprising a source system input field for receiving indication of the one or more source legacy systems, a resource input field for receiving indication of one or more data sets of a requested function, an operation input field for receiving indication of one or more operations of the requested function, an input parameters field for receiving indication of one or more input parameters of the requested function, an output parameters field for receiving indication of one or more output parameters of the requested function, and a server input field for receiving indication of one or more locations for deployment of the requested function;
   receiving, via the graphical user interface, user input indicating:
      via the source system input field, a first system of the one or more source legacy systems, wherein the first system is a mainframe having a first format;
      via the resource input field, a first data set of the requested function;
      via the operation input field, one or more operations of the requested function;
      via the input parameters field, one or more input parameters of the requested function;
      via the output parameters field, one or more output parameters of the requested function; and
      via the server input field, a second system for deployment of the requested function;
   identifying, using the mining tool and based on the user input, a function on the first system corresponding to the requested function, wherein the function is configurable to be independently executable;
   pulling, using the mining tool, the function from the first system;
   converting, based on the user input, the function from the first format to a second format, wherein the second format comprises an application programming interface positioned on top of the function; and
   deploying, based on the user input, the function in the second format onto the second system, wherein the second system is a server, and wherein the function is stored on the second system in the second format and configured to be called by a program.

18. The computer-implemented method of claim 17, wherein the second format specifies one or more routines configured to be called and executed within the program.

19. The computer-implemented method of claim 17 further comprising identifying a previously converted function stored in the second system in response to a user request for the requested function, wherein an operation of the requested function and the previously converted function are the same.

20. The computer-implemented method of claim 17 further comprising pulling the function from the first system in response to a user request for generating the function from the code on the first system.

\* \* \* \* \*